United States Patent
Admon (10) Patent No.: US 10,891,699 B2
(45) Date of Patent: Jan. 12, 2021

(54) SYSTEM AND METHOD IN SUPPORT OF DIGITAL DOCUMENT ANALYSIS

(71) Applicant: Legalogic Ltd., Tel-Aviv (IL)

(72) Inventor: Ilan Admon, Tel Aviv (IL)

(73) Assignee: Legalogic Ltd., Tel-Aviv (IL)

( * ) Notice: Subject to any disclaimer, the term of this patent is extended or adjusted under 35 U.S.C. 154(b) by 0 days.

(21) Appl. No.: 15/019,588

(22) Filed: Feb. 9, 2016

(65) Prior Publication Data
US 2016/0232630 A1 Aug. 11, 2016

Related U.S. Application Data

(60) Provisional application No. 62/113,714, filed on Feb. 9, 2015.

(51) Int. Cl.
  *G06Q 50/18* (2012.01)
  *G06F 16/34* (2019.01)
  *G06F 16/35* (2019.01)

(52) U.S. Cl.
  CPC ........... *G06Q 50/18* (2013.01); *G06F 16/345* (2019.01); *G06F 16/353* (2019.01)

(58) Field of Classification Search
  None
  See application file for complete search history.

(56) References Cited

U.S. PATENT DOCUMENTS 6,502,081 B1 * 12/2002 Wiltshire, Jr. .... G06F 17/30707
  706/12
7,137,065 B1 * 11/2006 Huang .............. G06F 17/30722
  707/999.003

(Continued)

FOREIGN PATENT DOCUMENTS

JP     2002197076 A  *  7/2002  .......... G06F 40/174

OTHER PUBLICATIONS

Branting L. K., Lester J. C. & Callaway C. B. (1998). Automated Judicial Document Drafting: A Discourse-Based Approach. Artificial Intelligence and Law, 6 (2/4), pp. 111-149. (Year: 1998).*

*Primary Examiner* — Minnah L Seoh
*Assistant Examiner* — Michael Young
(74) *Attorney, Agent, or Firm* — Pearl Cohen Zedek Latzer Baratz LLP (57) ABSTRACT

Systems and methods in support of digital document analysis receive a data file having a document containing text; determine a document classification for the document and at least one defined external consideration relating to the first document; section the first document into a plurality of sections; for each of the plurality of sections: implement a plurality of classification protocols; and generate one or more signal representations based on the document classification, the at least one defined external consideration, and the implemented plurality of classification protocols; identify one or more potential section classifications for one or more of the plurality of sections based on information relating to a training set of signal representations; determine a relative accuracy of the one or more potential section classifications for one or more of the plurality of sections; and output one or more recommended section classifications for one or more of the plurality of sections.

16 Claims, 2 Drawing Sheets

(56) References Cited

U.S. PATENT DOCUMENTS

| | | | |
|---|---|---|---|
| 2002/0083090 A1* | 6/2002 | Jeffrey | G06F 17/30011 715/202 |
| 2003/0009345 A1* | 1/2003 | Thorpe | G06Q 10/10 705/311 |
| 2003/0115080 A1* | 6/2003 | Kasravi | G06F 17/27 715/254 |
| 2007/0022072 A1* | 1/2007 | Kao | G06F 17/30719 706/45 |
| 2015/0088888 A1* | 3/2015 | Brennan | G06F 16/38 707/737 |
| 2015/0220539 A1* | 8/2015 | Lambert | G06F 17/30696 707/723 |

* cited by examiner

SYSTEM AND METHOD IN SUPPORT OF DIGITAL DOCUMENT ANALYSIS

CROSS-REFERENCE TO RELATED APPLICATIONS

This patent application claims the benefit of U.S. Provisional Patent Application Ser. No. 62/113,714, filed on Feb. 9, 2015, entitled "System and Method in Support of Digital Document Analysis," which is hereby incorporated by reference in its entirety.

FIELD OF THE INVENTION

The present invention is in the field of digital document analysis. In particular, the present invention is directed to providing improved analysis of legal documents.

BACKGROUND OF THE INVENTION

Many products exist in the legal technology market which aim to enhance the productivity and efficiency of attorneys in law firms and legal departments. Such products include office management software, online legal databases dedicated for specific legal fields, document and data management software, and document creation/editing software, for example.

The drafting of a legal document is one of the main activities of the typical lawyer. For years, the drafting was done manually: locating previous examples, copying and customizing them into a new document, etc. Today, various tools are available or being developed to make the document creation/drafting process more efficient and more automated. For example, tools which ask the lawyer specific questions and fill in the blanks in automated forms are relatively common. However, many of these tools require human customization and tailoring to be implemented. Also, most are static and do not change as a result of market developments or specific transaction circumstances. This requires the lawyer to spend a lot of time tailoring the output of these tools to his specific needs.

Other available systems focus on giving the lawyer a benchmark and a starting point for the agreement being drafted by providing templates from a template database. These systems are typically internal and only allow access to the firm's internal database. The template may reflect what is considered the firm's standard. Products of this type, however, require constant maintenance by groups of dedicated lawyers (inside or outside the firm). Such solutions are hard to maintain manually in order to be kept up-to-date and comprehensive. Furthermore, the work required from the lawyer to customize the template to the specific circumstances remains substantial.

An additional limitation of template-based systems is that they do not reflect the "market" but rather the status quo at the firm level, and the templates require constant manual updating. For this reason, these systems focus on specific categories of the most common documents, rather than a broader range of document types and circumstances. And even systems which may connect to an online template database in addition to the firm's databases require maintenance by many lawyers employed by the database owner. Using these databases requires excessive time to search for a relevant template, review it and customize it. Many online template databases further require that an attorney implement a checklist on each specific document and the checklist in itself does not assist the lawyer in the drafting work, but rather in identifying the issues to be addressed in the document. Furthermore, known template based systems cannot be used for reviewing a document, e.g. a document provided by an adverse party, as they do not include functionality for analyzing a given document Finally, presently available legal document summary and analysis systems typically require that the attorney manually define a standard legal document (e.g., an agreement or contract) and/or each field/section to be summarized therein, which can be an arduous task, prone to mistakes and overlooked details. In particular, when analyzing or summarizing a draft of a legal document, an attorney must establish the document type, determine relevant external considerations (such as, for example, the controlling jurisdiction, the party or parties being represented, etc.), which clauses and terms should and/or should not appear in the draft, etc. The accuracy and consistently with which these considerations are assessed may affect the analysis itself. Known presently available systems are not equipped to analyze and/or summarize legal documents with this level of detail and particularity.

What is needed, therefore, is a solution such that documents can be quickly and efficiently analyzed and summarized with minimal input from an attorney, and with a high degree of accuracy and particularity.

SUMMARY

An embodiment of the invention includes a system and method in support of digital document analysis. Embodiments may be performed on a server, for example, having a processor, memory, and one or more code sets stored in the memory and executing in the processor. In some embodiments, the method may include receiving a data file having a first document containing text; determining a document classification for the first document and at least one defined external consideration relating to the first document; sectioning the first document into a plurality of sections of text; for each of the plurality of sections: implementing a plurality of classification protocols; and generating one or more signal representations based on the document classification, the at least one defined external consideration, and the implemented plurality of classification protocols, in which a signal representation is a representation of a given section which indicates the existence of one or more predefined features of the given section; identifying one or more potential section classifications for one or more of the plurality of sections based on information relating to a training set of signal representations; determining a relative accuracy of the one or more potential section classifications for one or more of the plurality of sections; and outputting, based on the determined relative accuracy, one or more of the potential section classifications as one or more recommended section classifications for one or more of the plurality of sections.

In some embodiments, the document classification may include a type of legal document. In some embodiments, determining the at least one defined external consideration may include at least one of receiving, deriving and verifying the at least one defined external consideration; and the at least one defined external consideration may include at least one of a relevant jurisdiction, an applicable law, and a party being represented. In some embodiments, the plurality of classification protocols may include two or more of textual-based classification protocols, semantic-based classification protocols, and conceptual-based classification protocols. Some embodiments may include a preliminary step of defining the training set of signal representations based at least in part on provided sections of text having known section classifications.

In some embodiments, assessing the one or more potential section classifications may include: assigning a value for each instance in which a potential section classification is identified for a given section; aggregating the respective values; and identifying one or more of the one or more potential section classifications with the highest aggregated value. In some embodiments, the value may include an associated weighting based on at least one of: a frequency of a given identified potential section classification, a historical accuracy of a given implemented classification protocol, and a probability of accuracy of a given implemented classification protocol. Some embodiments may include implementing one or more overriding expert rules, and revising the output when a recommended section classification contravenes one of the one or more overriding expert rules.

Some embodiments may further include comparing the outputs of the first document and outputs of a plurality of previously classified documents having one or more previously classified sections; and identifying one or more differences between the outputs of the first document and outputs of one or more of the plurality of previously classified documents. So embodiments may include generating a summary of the first document, in which the summary includes at least the document classification and the outputted one or more recommended section classifications; comparing the summary with one or more sample summaries having the same document classification; and outputting one or more results of the comparison.

Further embodiments of the invention include receiving a data file having a first document containing at least one section of text, in which the first document has a document classification; at least one of deriving and verifying at least one defined external consideration relating to the first document; implementing a plurality of classification protocols for the at least one section of text; and generating one or more signal representations for the at least one section of text based on the document classification, the at least one defined external consideration, and the implemented plurality of classification protocols; identifying one or more potential section classifications for the at least one section based on information relating to a training set of signal representations; assessing the one or more potential section classifications; and outputting, based on the assessing, one or more recommended section classifications for the at least one section.

Some embodiments may include comparing the output of the first document and results of a plurality of previously classified documents having one or more previously classified sections; and identifying one or more differences between the results of the first document and results of one or more of the plurality of previously classified documents. Some embodiments may further include generating a summary of the first document, wherein the summary comprises at least the document classification and the outputted one or more recommended section classifications; comparing the summary with one or more sample summaries having the same document classification; and outputting one or more results of the comparison.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention provide an automated system and method for the analysis, generation and summary of legal documents by, for example, incorporating information about the document, relevant external considerations, and a plurality of classification protocols (e.g., one or more textual, semantic, probabilistic, and/or conceptual analysis algorithms and/or models for classifying sections of text in a digital document), and comparing results with training sets (e.g., previously analyzed/prepared samples) and/or expert rules (e.g., black-list and/or white-list rules that have been developed by legal experts) to further ensure accuracy of the analysis, as described herein.

The legal language typically found in legal documents is highly structured, and generally well written, and is therefore ideal for text analysis purposes. For example, agreements of the same kind include similar terminology, similar structure and can be categorized. Using text analysis algorithms, the system may analyze, classify and summarize entire legal documents and/or portions thereof. Of course, the systems and methods described herein are not limited to analysis of legal documents, and other documents may provide the same or similar qualities. For example, medical reports and articles, doctoral theses, and many literary works may contain these qualities as well.

As described herein, document analysis may comprise a number of layers, such as, for example: (1) algorithm-based analysis through unsupervised learning—e.g., the legal documents of a specific user (such as a law firm) may be processed and compared to statistical data about other agreements which have been previously processed by the system; (2) supervised learning analysis—e.g., combining formalized know-how defined by expert lawyers with machine learning algorithms; and (3) expert rules—implementing rules created by expert lawyers to tweak the analysis. In order to improve the system's accuracy and ensure its results are of a desired level, the system may be configured to compare the results of the system's analysis (e.g., continuously or periodically) with training sets, e.g., provided by legal experts, to create additional rules based on their accumulated legal knowledge and further research.

Embodiments of the system may employ artificial intelligence principles and weighing of the results of several algorithms which may analyze the same document in parallel. This analysis may enable analysis results based on identifying the legal concepts embodied in legal text. Accordingly, the system may employ several algorithms which may be customized to its needs in accordance with the intricacies and idiosyncrasies of the legal language. In some embodiments, the system is designed in a modular manner, allowing the addition and/or extraction of algorithms as may be needed in order to reach a desired output.

Figure 1:
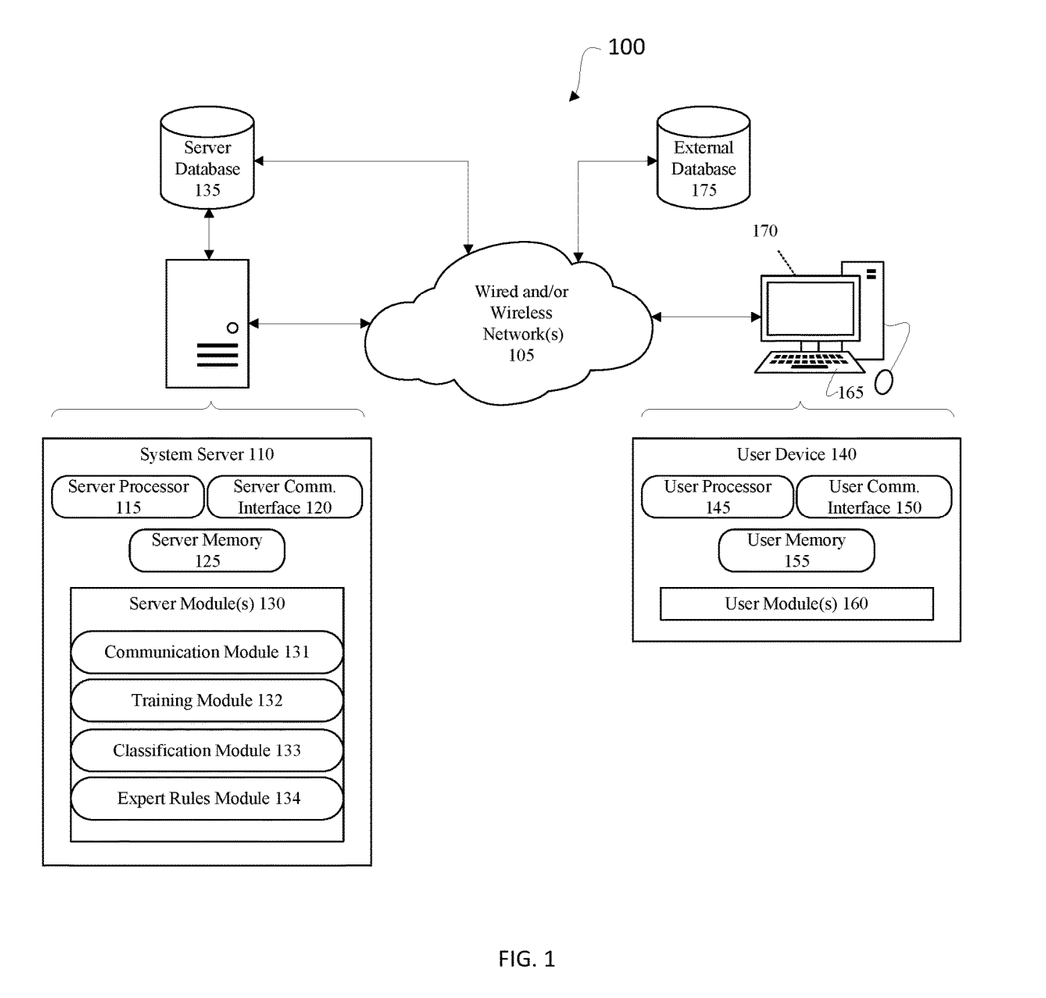
FIG. 1 is a high level diagram illustrating an example configuration of a system for providing digital document analysis according to at least one embodiment of the invention.
Figure 2:
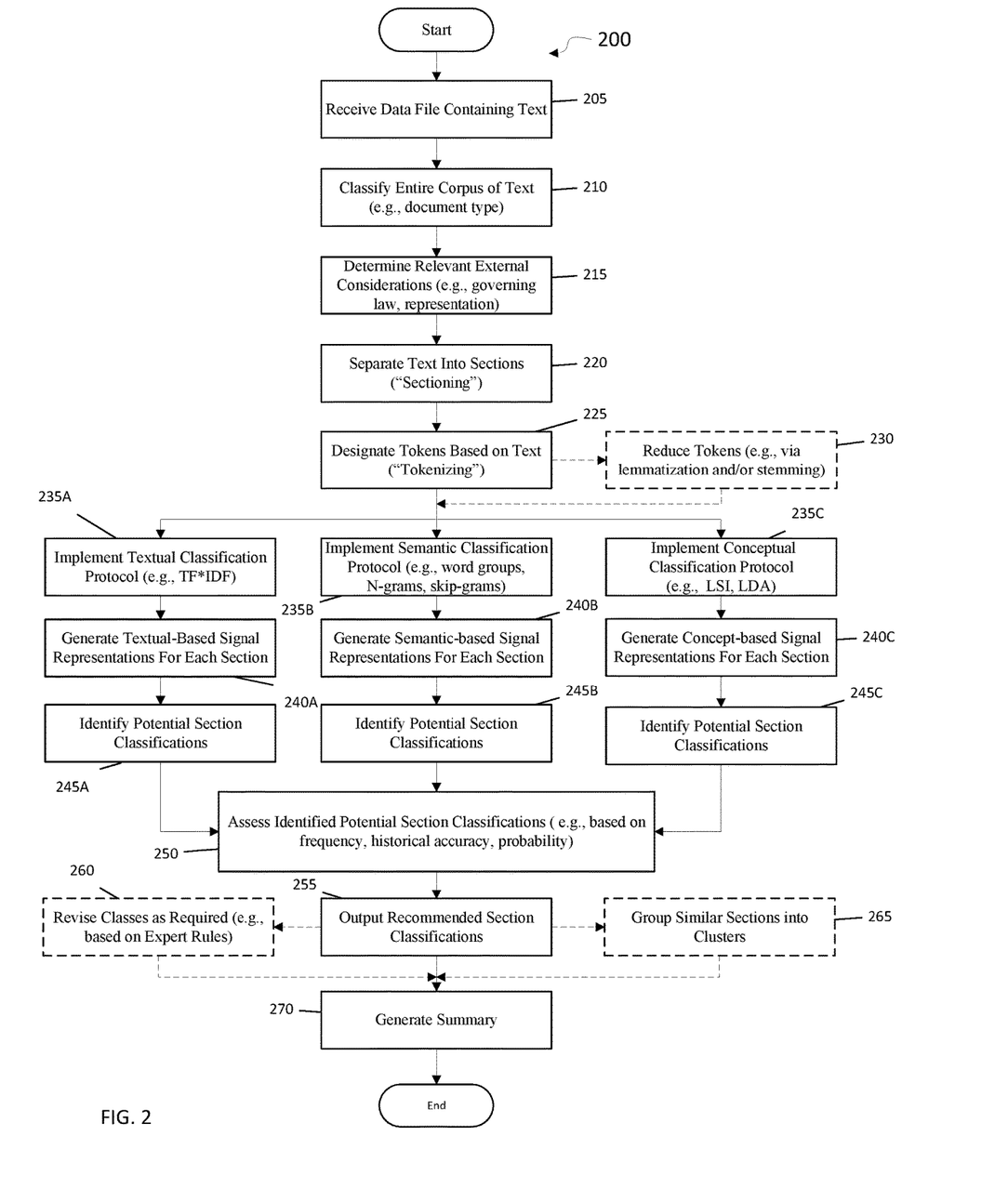
FIG. 2 is a flow diagram of a method in support of digital document analysis according to at least one embodiment of the invention.

These and other features of embodiments of the invention will be further understood with reference to FIGS. 1-2 as described herein.

FIG. 1 shows a high level diagram illustrating an example configuration of a system 100 in support of digital document analysis, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to chip-design testing and analysis, and other functions of embodiments of the invention as will be described in greater detail below. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

As shown in FIG. 1, the exemplary software modules may include a communication module 131, a training module 132, a classification module 133, and an expert rules module 134. Communication module 131 may be executed by server processor 115 to facilitate communication between system server 110 and the various software and hardware components of system 100, such as, for example, server database 135, client device 140, and/or external database 175 as described herein. Training module 132, as described in detail herein, may be executed by server processor 115 to generate and manage training sets. A training set, as understood herein, is a set of documents, and possible information about these documents (e.g. manual and/or automated annotation), that may be used to train and enhance the performance of the classification module 133. For example, the training set may be used to extract details which reflect and/or represent, for example, how a particular word, phrase, clause, section, paragraph, chapter, and/or document may be interpreted and/or classified in accordance with embodiments of the invention. Classification module 133 may be executed by server processor 115 to process and/or analyze new (e.g., previously unanalyzed) documents, based, at least in part, on comparing them with information relating to one or more training sets as described herein. Expert rules module 134 may be executed by server processor 115 to monitor and/or override recommendations (e.g., recommendation of a section classification) made by classification module 133 when a recommendation contravenes an overriding expert rule.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database (s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to analysis (e.g., training sets) of those and other documents. In some embodiments, database 135 may further store information related to expert rules that have been created, for example, by human experts, and which may be implemented as described herein.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, create and/or provide one or more documents for system server 110 to analyze, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smart-phones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

FIG. 2 is a flow diagram of a method 200 in support of digital document analysis according to at least one embodiment of the invention. In some embodiments, method 200 may be performed on a computer (e.g., system server 110) having a processor (e.g., server processor 115), memory (e.g., server memory 125), and one or more code sets (e.g., server module(s) 130) stored in the memory and executing in the processor. The method begins at step 205, when a data file having a first document containing text is received at the processor. The text is typically provided in the form of one or more digital documents (hereinafter "documents"). A document (and the text therein) is a sequence of characters. In order to analyze the content in a document (e.g., the information expressed in the text), this sequence may undergo a number of preprocessing steps, as described herein.

At step 210, in some embodiments, the processor may determine a document classification for the document. A document classification may be a document type, such as, e.g., an employment contract, lease, or other type of legal document, etc. In some embodiments, the classification of the document identifies the specific type of document, which, in various embodiments, may include a particular structure, particular subject matter, particular language and/or wording, and/or may have a particular origin, creation date, author(s), source, etc. In some embodiments, successful analysis of the document may depend, at least in part, on the document classification, as the document classification may provide context for the analysis of the text in the document. For example, if the document is classified as a particular type of legal document, e.g., a commercial real estate lease agreement, certain text (e.g., sections of text) may be expected to be included in the document. As such, in some embodiments, further analysis of the document may be tailored based on the document classification.

In some embodiments, the document classification may be determined based on information provided by a user who submitted the document, e.g., by receiving or retrieving information relating to the document type from a database containing document information, including the document type. In some embodiments, a document classification may be determined based on metadata provided with the received data file, e.g., file name, author name, administrative rights, file type, title, etc. In some embodiments, a document classification may be determined based on a document name or title appended to or found within the text of the document. In some embodiments, the entire text in the document may be processed as one section of text, and may be analyzed using one or more of the techniques described herein with regard to sections of text in order to determine a classification for the entire document (e.g., a document classification). In other embodiments, particular portions of text may be analyzed using one or more of the techniques described herein with regard to sections of text in order to determine a classification of the entire document, such as, for example, when a document contains a "title", "summary", or "introduction" section from which the document classification may be determined.

At step 215, the processor may determine at least one defined external consideration relating to the first document. In some embodiments, determining the at least one defined external consideration may include, e.g., receiving, deriving and/or verifying the at least one defined external consideration. Generally, when analyzing a document, there may be relevant external considerations which may or may not be expressed specifically in the body (e.g., text) of the document (e.g., considerations that are external to the text itself), but may nonetheless be significant to a proper analysis of the document text. This may be particularly the case with regard to legal documents, where there may be a number of relevant external considerations which may provide insight as to what information is expected to be reflected in the document. Such examples of defined external considerations may include at least one of: a relevant jurisdiction, applicable law, and/or a party being represented, among others. For example, in some embodiments, determining an external consideration such as the governing law of a contract being analyzed may be particularly important, since in different legal systems the same contract may include different provisions under different jurisdictions (e.g. a NY lease differs from a California lease because of different tenant protection laws).

In some embodiments, details of such external considerations may be received, for example, with the document or prior to analysis thereof. In some embodiments, such external considerations may be derived from text in the document, from metadata appended to the document, from information provided by a user, etc. For example, a document containing metadata indicating that the document was drafted by a plaintiff's attorney in a legal dispute between a plaintiff and a defendant may then be analyzed from the perspective of the plaintiff (e.g., ensuring that clauses which inure to the benefit of the plaintiff are included while flagging clauses which are to the plaintiff's detriment). In some embodiments, regardless of whether an external consideration was received or derived, the system may be configured to verify the external considerations. For example, the system may be configured to access data associated with the document (e.g. the data in a firm's document management systems, such as, client names, etc.), to verify the external considerations. By way of another example, a document may be received via an e-mail account associated with the seller in a purchase agreement with a buyer. The system may be configured, for example, to verify that the document is to be analyzed from the perspective of the seller and not the buyer, or taking both the seller and buyer into account.

In other embodiments, verification may be more substantive. For example, an employment contract may be received with information indicating an external consideration to be considered is that the contract will be governed by state law of a particular state. The system may be configured, for example, to access one or more legal information systems and/or databases (e.g., government database, etc.) to verify, e.g., that such state law exists, is still in effect, and/or that the document type may be governed by state law as opposed to federal law. This may be especially important, for example, when a particular document type is required to be governed by only one governing body (e.g., federal law).

At step 220, in some embodiments, the processor may section the first document into a plurality of sections of text. In some embodiments, sectioning may include breaking the documents into paragraphs. In some embodiments, such as when the document has been provided with paragraph breaks or any other formatting indicating groups of text, sectioning may include designating each paragraph or group as a section based, e.g., on the formatting. In some embodiments, sections may be designated, e.g., based on a table of contents, an index, etc. Sectioning may also include, for example, identifying the document title, date, signature area, and/or other particular sections. In some embodiments, for example, when a document has only one clause or paragraph, sectioning may not be required, or the sole clause or paragraph may be designated as a section. Furthermore, in embodiments wherein there are a number of relatively short clauses or sentences which, due to formatting, appear as separate paragraphs, the system may be configured to combine (e.g., group) such clauses or sentences into one or more sections. For example, a document may be formatted with a tree structure in which it is evident from the formatting that certain clause, sentences, or lines of text belong to the same section despite being separated by spacing, for example, the processor may be configured to section the disparate texts into one or more sections.

At step 225, in some embodiments, the text of each section may be further processed by a tokenizing process. The processor may further break (e.g., designate, separate, etc.) the document into separate "tokens". A token, as understood herein, may be a sequence of one or more characters that has a "meaning". Generally, tokens may simply be words that make up a particular language, such as, e.g., the English language. In some embodiments, other characters and sequences, such as, for example, punctuation marks, numbers, e-mail addresses, internet addresses, etc., may also be considered tokens. In some embodiments, tokenizing may not be a trivial task, as the processor may be required to distinguish between a dot that is a punctuation mark—which is a separate token—and a dot that is part of another token, such as in an abbreviation (e.g., the period in "Inc."), which may not be a separate token.

At step 230, in some embodiments, tokens designated in the previous step may be reduced (e.g., combined, eliminated, etc.) based on further processing steps, such as, for example, lemmatization or stemming. Lemmatization is a process of grouping together different inflected forms of a word so they can be analyzed as a single item. This may be an algorithmic process of determining the lemma for a given word. A lemma may be understood as the canonical form, dictionary form, or citation form of a set of words. For example, run, runs, ran and running are forms of the same lexeme, with run as the lemma. Lexeme, in this context, refers to the set of all the forms that have the same meaning, and lemma refers to the particular form that is chosen by convention to represent the lexeme. In many languages, words appear in several inflected forms. For example, in English, the verb 'to walk' may appear as 'walk', 'walked', 'walks', 'walking'. The base form, 'walk', which one might look up in a dictionary, may be designated as the lemma for the word. The combination of the base form with the part of speech is often called the lexeme of the word.

Stemming is a process by which words (e.g., tokens) may be reduced to their base, or root form, e.g. "eating" to "eat" and "eats" to "eat". In some embodiments a stemmed word itself might not be a valid word. For example, the word 'lazy' may be stemmed to 'lazi'. This is because the purpose of stemming is not to produce the appropriate lemma—that is a more challenging task that requires knowledge of context. The main purpose of stemming is to map different forms of a word to a single form. For example, the word 'laziness' may be stemmed to 'lazi', and would therefore have the same stem as 'lazy'.

Lemmatization and stemming are closely related processes. A significant difference between them is that stemming operates on a single word without knowledge of the context, and therefore cannot discriminate between words which have different meanings depending on part of speech. However, stemming may be easier to implement and may be a faster process, and the reduced accuracy may not matter for some applications. For instance: the word "better" may have "good" as its lemma. This link would be missed by stemming, as it requires a dictionary look-up. The word "walk" is the base form for the word "walking", and hence this is matched in both stemming and lemmatization. The word "meeting" may be either the base form of a noun or a form of a verb ("to meet") depending on the context, e.g., "in our last meeting" or "we are meeting again tomorrow". Unlike stemming, lemmatization can in principle select the appropriate lemma depending on the context. In some embodiments, lemmatization and/or stemming may be performed in order to reduce the number of tokens in a document. Of course, one or both of these processes may not be required. For example, in some embodiments, lemmatization and/or stemming may only be implemented when a document has a minimum number of words, or when a threshold number of tokens have been identified.

At steps 235A, 235B, and/or 235C, in some embodiments, the processor may implement one or more of a plurality of classification protocols (e.g., algorithms, models, and/or other computational, mathematical, and/or procedural functions) for each of the plurality of sections, e.g., concurrently, consecutively, etc. In some embodiments, implementing the one or more of a plurality of classification protocols may include, for example, loading, retrieving, accessing, preparing, selecting, or otherwise activating one or more of the classification protocols, and/or one or more related libraries (e.g., dictionary libraries) and/or databases of information. In some embodiments, the related libraries and/or databases of information may contain, for example, particular information necessary and/or useful for analyzing the text of the various sections, and may be used by the classification protocols to generate one or more signal representations for one or more of the plurality of sections, as described in detail herein. For example, a particular classification protocol may load a particular set of libraries of information depending on the type of document being analyzed and/or the relevant jurisdiction.

Furthermore, in various embodiments, any number of different combinations of classification protocols may be implemented, e.g., in parallel, consecutively, and/or as needed. For example, at step 235A, the processor may implement a textual classification protocol, such as, e.g., term frequency-inverse document frequency weighting (hereinafter "TF-IDF"). TF-IDF provides a weight that is typically a statistical measure used to evaluate how important a word is to a document, e.g., in a collection or corpus. The importance of a word increases proportionally to the number of times the word appears in the document but is offset by the frequency of the word in the corpus. Variations of the TF-IDF weighting protocol are often used by search engines as a central tool in scoring and ranking a document's relevance given a user query, for example.

There are many variations to the TF-IDF weighting protocol, any of which may be implemented in accordance with various embodiments of the invention. However, typically, the TF-IDF weight includes two terms: (1) TF—Term Frequency, which measures how frequently a term occurs in a document. Since every document is different in length, it is possible that a term may appear more frequently in long documents than shorter ones. Thus, the term frequency is often divided by the document length (e.g., the total number of terms in the document) as a way of normalization. (2) IDF—Inverse Document Frequency, which measures how important a term is. While computing TF, all terms are generally considered equally important. However it is known that certain terms, such as "is", "of", and "that", may appear more frequently in a document than other words, but have little importance. Thus frequent terms may be weighed down while more rare words may be scaled up in value. Of course, other textual classification protocols in addition to or in place of TF-IDF may also be implemented, such as, for example, "bag of words", etc.

In some embodiments, the processor may implement other/additional classification protocols for each of the plurality of sections. For example, at step 235B, the processor may implement a semantic classification protocol, such as, e.g., an N-gram protocol and/or a skip-gram protocol. N-grams are word prediction formulas based on probabilistic models, which attempt to predict the next word based on the previous N−1 words. Such statistical models of word sequences are also called language models or LMs. The goal of a simple N-gram language model, is to determine the probability of a word, conditioned on some number of previous words (one word in a bigram model, two words in a trigram model, etc.) Computing the probability of the next word is closely related to computing the probability of a sequence of words appearing together prior to the next word. Skip-grams are a generalization of N-grams in which the components (typically words or tokens) need not be consecutive in the text under consideration, but may leave gaps that are skipped over. Formally, an n-gram is a consecutive subsequence of length n of some sequence of tokens $w_1 \ldots w_n$. A k-skip-n-gram is a length-n subsequence where the components occur at distance at most k from each other. Of course, many such models exist, any number of which may be implemented in accordance with various embodiments of the invention, such as, for example, Naïve bayes classifiers, etc.

In some embodiments, the processor may implement yet other/additional classification protocols for each of the plurality of sections. For example, at step 235C, the processor may implement a conceptual classification protocol, such as, e.g., latent semantic indexing (LSI) and/or latent Dirichlet allocation (LDA). LSI is an indexing and retrieval method that typically uses a mathematical technique called singular value decomposition (SVD) to identify patterns in the relationships between the terms and concepts contained in an unstructured collection of text. LSI is based on the principle that words that are used in the same contexts tend to have similar meanings. A key feature of LSI is its ability to extract the conceptual content of a body of text by establishing associations between those terms that occur in similar contexts.

LDA is a generative model that allows sets of observations to be explained by unobserved groups that explain why some parts of the data are similar. For example, if observations are words collected into documents, it posits that each document is a mixture of a small number of topics and that each word's creation is attributable to one of the document's topics. Of course, many such models exist, any number of which may be implemented in accordance with various embodiments of the invention, such as, for example, probabilistic LSI (pLSI), etc. In some embodiments, the plurality of classification protocols may include two or more of the textual-based classification protocols, semantic-based classification protocols, and conceptual-based classification protocols, and/or may include other addition/alternative classification protocols depending on the particular implementation.

At steps 240A, 240B, and/or 240C, for each of the plurality of sections, the processor may generate one or more signal representations based on, for example, the document classification, the at least one defined external consideration, and/or the implemented plurality of classification protocols (e.g., textual, semantic and/or conceptual algorithms/models, etc.). A signal representation, as understood herein, is a representation of the section which may signal (e.g., indicate the existence of) one or more particular (e.g., predefined) essential or identified features of the section. As described herein, in some embodiments, different algorithms, dictionary models, etc., will have been implemented (e.g., loaded) for different document types and/or for different external considerations, and the processor may generate the one or more signal representations based on these considerations.

By way of example, in some embodiments, a signal representation of a section may be a vector representation. A vector is a sequence of numbers. For example, the following are vectors of varying lengths (vectors may be denoted, e.g., with parenthesis on both ends of the list and commas in between): (1, 0, 0, 18, −1); (−6, 0.23, 45); (0, 9, 9, 9, 9, 9, 8, 0, 0, 9, 9, 7, 8, 7, 32, 23, 245243, 82, 1, 1, 1, 0, 0, 0); and (0.1, 0.2, −0.3, 2, 5). The length of a vector is the amount of numbers therein. For example, the first and last vectors in the above examples each have a length of five (5). Vectors may be used, e.g., to represent lists of numerical information. For example, a vector may be used to represent the course grades of students. For this, a fixed ordering of the courses (e.g. calculus, Biology, English grammar) may be selected, and then the course grades may be represented as a vector (e.g. (95, 87, 76) for Mark, and (99, 82, 100) for Mary—meaning that Mark got 87 in Biology and Mary got 99 in calculus).

In the context of text analysis, vectors may be used for representing information about text. For example, a fixed ordering of all possible words may be selected (e.g., according to their order in a dictionary). Then, the text of a section, for example, may be transformed into a vector that represents, e.g., the number of appearances of each word. Specifically, for each i, the i-th number in the vector will be the amount of times the i-th word appeared in the text. As such, in this example case, almost all of the vector may be 0's. Also, this representation may not convey all the information present in the text. In particular, it may ignore the location of the words. For example, the sentences "the cat ate the dog" and "the dog ate the cat" may have the exact same representation, while their meanings would obviously be different. This is common in text analysis. In some embodiments, text may be transformed into simple representation (commonly—into vectors) while losing some information in the process. As such, a key goal in signal representation is to generate representations in such a way so as to strike the right balance between keeping the essential information, and allowing computational tractability. Therefore, in some embodiments, by including the document classification and the at least one defined external consideration, for example, signal representations may be generated which may more accurately reflect the content of a given section.

Of course, in some embodiments, signal representations may be in other forms, such as, for example, in matrix form, etc., provided that essential features can be adequately represented. In some embodiments the processor may determine the essential features of a sequence of words in a given section. These features may then be used, for example, as a representation of the section in the subsequent analysis of the section. The features may be based on the words of the section, but, in general, are not simply the sequences of words themselves. An elementary representation of a section may be, for example, the list—not the sequence—of tokens appearing in the section. This representation disregards the order between tokens; hence it is frequently called a "bag of words" representation. More elaborate representations may also include, for example, the number of times a token appears, etc. Other representations may focus only on a specific sub-set of the tokens (e.g. those that appear most frequently), depending on the classification protocol that has been implemented.

At steps 245A, 245B, and/or 245C, in some embodiments, the processor may identify one or more potential section classifications for one or more of the plurality of sections based on, e.g., information relating to a training set of signal representations, and/or based on the generated signal representation of the plurality of sections. In some embodiments, as described herein, the document type and/or the external consideration(s) may further impact identification of the one or more potential section classifications. In some embodiments, a section classification may be understood as a possible general description of a given text. For example a predefined list of "classes" may be provided to the system, such as, e.g., "payment term", "justification", "escrow", etc. The processor may therefore take a section of text and assign it to relevant potential classes (zero or more), for example, based on previous examination of one or more training sets, as described herein. In some embodiments, this may include a preliminary step of defining a training set of signal representations based at least in part on provided sections of text having known section classifications. The classification may be affected by the document type. For example, an "escrow" paragraph may be classified as "irrelevant" in an NDA document, but "acceptable" in a software agreement. The classification may further be determined, in part, based on the external consideration. For example, a broad eviction clause may be classified as "too broad" when representing the tenant but "good" if representing the landlord.

In some embodiments, the processor may employ one or more machine learning algorithms, e.g., to automatically "learn" one or more classification rules/schemas from provided examples. For example, the system may be provided with a number of texts (e.g., a large number of texts) together with their correct classifications, to be used as "training sets". In some embodiments, training sets may be created by expert lawyers, an administrative legal development team, and/or an end user, for example, who may determine the proper set of classes for each section. As such, the processor may compute one or several types of statistics from these training set (e.g., the percentage of text classified as "sports" that contain the word "win", vs. the percentage of texts not classified as "sports" that contain the word "win"). In some embodiments, as described herein, these statistics may be applied to the evaluation of new texts/documents. For example, based on these statistics the machine learning algorithm may build a set rules (e.g., a "model" or "classifier"), that may determine how to classify future texts based on the information relating to the training sets (e.g., statistics and/or other data extracted from the training sets).

In some embodiments, the information relating to a training set may include one or more generated signal representations (e.g., vectors) of a training set of signal representations. In such embodiments, generated signal representations of the sections of text may be compared directly with signal representations of the training set in order to identify the one or more potential section classifications. In some embodiments, the information relating to a training set may include one or more statistics generated during prior analysis/examination of other sections of text in a training set having known signal representations. In such embodiments, the one or more statistics may be applied to the one or more of the plurality of sections in order to identify the one or more potential section classifications.

At step 250, in some embodiments, the processor may assess the one or more potential section classifications for one or more of the plurality of sections, e.g., by determining a relative accuracy of each of the one or more potential section classifications. As described herein, the system may implement several different classification algorithms (e.g., via one or more classification protocols). For any specific text, these algorithms may agree or disagree as to the correct classification. In some embodiments, if all agree, the one or more potential section classifications are determined to be accurate, and no further decision may need to be made by the system prior to outputting the recommended result (e.g., the recommended section classification or classifications). If they disagree, the system may determine what final output to recommend. In various embodiments, a number of classification protocols may be implemented for each section, and each protocol may produce a number of identified potential section classifications, as described herein. Therefore, the system may be configured to assess the various results for each section, and determine, e.g., which potential section classification(s) are more likely than others to accurately represent a given section (e.g., the relative accuracy of the potential section classifications).

As such, in some embodiments, assessing the potential section classifications (e.g., determining a relative accuracy of the potential section classifications) may include, for example, assigning a value for each instance in which a potential section classification is identified for a given section, aggregating the respective values, and identifying one or more of the one or more potential section classifications with the highest aggregated value, as described herein. In some embodiments, the value assigned may include an associated weighting based on, for example: the frequency of a given identified potential section classification, the historical accuracy of a given implemented classification protocol, and/or the probability of accuracy of a given implemented classification protocol.

In some embodiments, the processor may measure the accuracy of each classification protocol (e.g., by employing one or more metrics such as "recall" and/or "precision" for a given algorithm) as per each of the potential section classifications. (Typically, high precision may mean that an algorithm returned substantially more relevant results than irrelevant, while high recall may mean that an algorithm returned most of the relevant results.) The decisions of the classification protocols may then be weighed, e.g., by the known accuracy for each algorithm and/or the level of certainty that is returned by each classification protocol. In some embodiments, the processor may weigh the probability of a certain clause appearing in this type of document, and/or the likelihood of certain provisions to appear only once per document, for example.

In some embodiments, the processor may assess the potential section classifications as described herein (e.g., determine a relative accuracy of the potential section classifications) by implementing, for example, a voting machine process. The voting machine may aggregate the classifications produced by each of the implemented classification protocols and from them determine, for example, a single classification. Each classification of an individual classification protocol (e.g., each instance of a potential section classification) may be considered a "vote" for that potential section classification; hence the descriptor "voting machine". In some embodiments, the processor may simply count the number of votes for each potential section classification (e.g., each class) and, e.g., take the one with the highest number of votes.

In some embodiments, one or more different weights may be assigned to the different algorithms, for example, giving a higher weight to algorithms that, on average, have a track record of performing better versus others. The weights may be determined, e.g., based on success rates calculated on test data with known classification. In some embodiments, the weighting may be different for different classes. For example, in an embodiment in which representative algorithm "A" performs well on a class X but poorly on class Y, and another representative algorithm "B" performs poorly on the same class X but well on the class Y, algorithm A may be assigned a high weight with respect to class X and a low weight with respect to class Y, and vice versa for algorithm B.

In some embodiments each classification protocol may output a "confidence score" (e.g., along with a given identified potential section classification) which may represent the probability that the potential section classification is the correct classification. Many algorithms include the functionality to produce such a confidence score. Given these confidence scores, the voting may be weighted by the confidence scores. In some embodiments, two or more of the weighting methods described herein may be combined. For example, embodiments of the invention may evaluate the following text: "This Agreement shall be effective as of the date of the last signature as written below and will continue for a period of five (5) years. Either party may terminate this Agreement at any time without cause on thirty (30) days written notice. However, the confidentiality obligations accruing prior to termination as set forth herein shall survive for a period of five (5) years from the date of the receipt thereof by Recipient."

Regarding the example section, algorithm A may identify, e.g., the following four potential section classifications, along with respective confidence scores (e.g., probability): (1) "Terms of Confidentiality" with a probability of 96%; (2) "Term" with a probability of 64%; (3) "Need to Know" with a probability of 12%; and (4) "Termination" with a probability of 10%.

Regarding the example section, algorithm B may identify, e.g., the following four potential section classifications, along with respective confidence scores (e.g., probability): (1) "Terms of Confidentiality" with a probability of 87%; (2) "Termination" with a probability of 70%; (3) "Term" with a probability of 24%; and (4) "Definition of Confidential Information" with a probability of 4%.

At step 255, the processor may output one or more of the potential section classifications as one or more recommended section classifications for one or more of the plurality of sections, based, for example, on the assessing (e.g., based on the determined relative accuracy of the one or more potential section classifications, as described herein). In the above example, the combined (weighted) voting may yield a final decision in determining one or more recommended section classifications, e.g.: Terms of Confidentiality; Term; Need to Know; and Termination.

Based on the example section above, the following table reflects actual data generated by implementation of embodiments of the invention:

| Recommended Classification | Score A | Score B |
| --- | --- | --- |
| Termination | 0.847187230985337 | −0.110868357665836 |
| Term of Confidentiality | −0.0788593436403533 | 0.601837284185303 |
| Term | 0.338646902865428 | 0.176191925133883 |
| Trade Secret Survival | −4.70224798722838E−07 | −4.09713787071052E−09 |
| Jury Trial Waiver | −1.43438954406852E−06 | −4.51570393143827E−09 |
| Service of Process | −1.88041638727718E−06 | −4.5232736553594E−09 |

It should be noted that, depending on the document text provided, there may be some embodiments when the processes implemented by the classification protocols and/or the voting machine may not produce expected or otherwise adequate results (e.g., as defined manually by a user, an administrative legal development team, and/or by the processor based on some predefined criteria or threshold). As such, at step 260, in some embodiments, the processor may be configured to override certain decisions, e.g., by implementing one or more overriding expert rules. In some embodiments, such overriding rules may be applied to the document as a whole and/or to one or more sections of the document as necessary.

For example, in some embodiments, a predefined set of white-list (e.g., "do this") and/or black-list (e.g., "do not do this") rules, may be "handcrafted" by a human expert, and/or set by an administrative legal development team, by a user, etc. Such overriding expert rules may be implemented by the processor to determine how to classify a given text, e.g., irrespective of, or in consult with, previously generated results. For example, a rule may state "if the stem 'compete' appears in the text, then classify it as 'non-compete'". In some embodiments, the set of rules may be complex, e.g., governing how to deal with conflicting rules, etc. In some embodiments, the processor may revise the output when a recommended section classification contravenes one of the one or more overriding expert rules, e.g., automatically. In some embodiments, the processor may provide a notification or other indicator, for example, indicating that a recommended section classification contravenes one of the one or more overriding expert rules, and/or may request permission to revise the output accordingly.

At step 265, in some embodiments, the processor may group similar sections into clusters. For example, the processor may take a large number of texts (e.g., sections) and group them into clusters. As such, similar texts may appear in the same cluster, while dissimilar texts may appear in different clusters. For example, if the system detects that two (or more) consecutive paragraphs appear to address the same provision, the processor may cluster those sections together into one section. Of course, in some embodiments, this clustering process may be implemented at any stage of the document analysis, such as, for example, prior to implementation of any expert rules.

It should be noted that, in some embodiments, the system may identify classifications linearly, that is, consider each possible classification separately, and identify, for each section, whether the given classification is appropriate. In other embodiments, instead of, or in addition to, a linear approach, the system may combine classifications into a hierarchy of super-concepts and sub-concepts. For example, the processor may first detect that a paragraph in a residential lease deals with utilities before trying to classify whether it is the tenant or landlord who is in charge of paying the bills. In some embodiments, this may be implemented, for example, by analyzing the sections of a document to identify classifications in a predetermined order. This may allow for the building of classifiers in a much more restricted context, and may produce more accurate classifications.

For example, in considering the following two sentences: (i) "it is the tenant's responsibility to pay for gas and electricity bills"; and (ii) "it is the landlord's responsibility to pay for gas and electricity bills"; the only "signals" differentiating these opposite sentences are the words "landlord" and "tenant". Both words may appear extremely frequently in a lease agreement, and may therefore be considered very weak signals. As such, in some embodiments, the system may be configured to first determine that the section in which the sentence appears is a Utilities clause, e.g., based on relatively strong signals (such as, for example, Gas, Electricity, Bills, etc.). The system may then examine which sub-class of a Utilities clause this section refers to by using statistical classification models trained solely in the context of Utilities clauses. In these restricted context models, the common terms (e.g. Gas, Electricity, Bills) may become weak signals, while the differentiating words (tenant, landlord) may be considered stronger signals, thus allowing for a more concise determination of the sub-class (e.g. Utilities—paid by owner vs. Utilities—paid by tenant).

At step 270, in some embodiments, the processor may generate a summary of a first document that has been analyzed. There are many forms of summarization. For example, in some embodiments, a summary may include a summary of an entire set of text (e.g., an entire document). In some embodiment, the system may provide a summary of specific elements and/or item existing in the text. For example, in a service agreement the system may be configured to look for: (i) the period of the service, (ii) the location, (iii) the amount to be paid, (iv) the payment terms, and/or (v) if one can cancel the agreement. This information may be extracted from the text and, e.g., presented in some type of summary table.

In some embodiments, the processor may implement a technique called "information extraction" to generate a summary of specific elements and/or item. The processor may determine, e.g., patterns that suggest a specific type of information. For example, a number with a dollar sign ("$") appearing after the words "will pay" may be identified as the amount to be paid. Of course, other patterns may be more complex.

In some embodiments, one or more procedures to determine these patterns may be implemented. For example, one procedure may be for patterns to be manually defined and/or provided to the system, which may then identify the patterns. Another procedure may be based on "machine learning". For example, training sets including examples of the texts and the desired outcome of each may be provided to the system, and the processor may deduce one or more patterns from these examples.

In some embodiments, the summary may include, for example, at least the document classification and/or the outputted one or more recommended section classifications, among other details of the analysis. In some embodiments, the processor may then compare the summary with one or more sample summaries (e.g., provided from training sets as described herein) having the same or a similar document classification, and output one or more results of the comparison.

In some embodiments, in addition to or in place of providing summaries, the processor may compare the outputs of the first document (e.g., a document that has been analyzed) and outputs of one or a plurality of previously classified documents having one or more previously classified sections. As such, in some embodiments, the processor may identify one or more differences between the outputs of the first document and outputs of one or more of the plurality of previously classified documents. This may be particularly appropriate, for example, when a user desires to determine whether a document (e.g., a legal document) contains all the same or similar sections of text as other supposedly similar documents (e.g., the lack of a mortgage contingency clause in a purchase agreement for a property). Likewise, this process may be equally effective in identifying text which has been added to a document and/or which would otherwise not be expected to appear in a document (e.g., a rider requiring non-standard assurances by one party).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method in support of digital document analysis, performed on a server having a processor, a memory, and one or more code sets stored in the memory and executed by the processor, the method comprising:
  receiving at the processor a data file having a first document containing text;
  receiving at the processor, at least one defined external consideration relating to the first document;
    wherein the at least one defined external consideration comprises one or more preferences of a party being represented; and
    wherein the at least one defined external consideration is not expressed specifically in the text of the first document;
  determining, by the processor, a document classification for the first document;
    wherein the text in the first document is processed as one section of text in determining the document classification for the first document;
  sectioning, by the processor, the first document into a plurality of sections of text;
  for each of the plurality of sections:
    implementing, by the processor, a plurality of classification protocols;
      wherein the plurality of classification protocols comprises two or more of: a textual classification protocol, a semantic classification protocol, and a conceptual classification protocol; and
    generating, by the processor, one or more signal representations of a given section based on the document classification, the at least one defined external consideration, and the implemented plurality of classification protocols;
      wherein a signal representation is presented as a numerical vector representation;
  identifying, by the processor, one or more potential section classifications for one or more of the plurality of sections based on information relating to a training set of signal representations and based on the one or more generated signal representations of each of the plurality of sections;
  determining, by the processor, a relative accuracy of the one or more potential section classifications for one or more of the plurality of sections; and
  outputting, by the processor, based on the determined relative accuracy, one or more of the potential section classifications as one or more recommended section classifications for one or more of the plurality of sections.

2. The method as in claim 1, wherein the document classification comprises a type of legal document.

3. The method as in claim 1, further comprising a preliminary step of defining the training set of signal representations based at least in part on provided sections of text having known section classifications.

4. The method as in claim 1, wherein determining the relative accuracy of the one or more potential section classifications comprises:
  assigning a value for each instance in which a potential section classification is identified for a given section;
  aggregating the respective values; and identifying one or more of the one or more potential section classifications with the highest aggregated value.

5. The method as in claim 4, wherein the value includes an associated weighting based on at least one of:
a frequency of a given identified potential section classification, a historical accuracy of a given implemented classification protocol, and a probability of accuracy of a given implemented classification protocol.

6. The method as in claim 1, further comprising:
implementing one or more overriding expert rules; and
revising the output when a recommended section classification contravenes one of the one or more overriding expert rules.

7. The method as in claim 1, further comprising:
comparing the outputs of the first document and outputs of a plurality of previously classified documents having one or more previously classified sections; and
identifying one or more differences between the outputs of the first document and outputs of one or more of the plurality of previously classified documents.

8. The method as in claim 1, further comprising:
generating a summary of the first document, wherein the summary comprises at least the document classification and the outputted one or more recommended section classifications;
comparing the summary with one or more sample summaries having the same document classification; and
outputting one or more results of the comparison.

9. A system in support of digital document analysis comprising:
a server having a processor, and a memory; and
one or more code sets stored in the memory and executed by the processor, which, when executed, configure the processor to:
receive a data file having a first document containing text;
receive at least one defined external consideration relating to the first document;
wherein the at least one defined external consideration comprises one or more preferences of a party being represented; and
wherein the at least one defined external consideration is not expressed specifically in the text of the first document;
determine a document classification for the first document;
wherein the text in the first document is processed as one section of text in determining the document classification for the first document;
section the first document into a plurality of sections of text;
for each of the plurality of sections:
implement a plurality of classification protocols;
wherein the plurality of classification protocols comprises two or more of: a textual classification protocol, a semantic classification protocol, and a conceptual classification protocol; and
generate one or more signal representations of a given section based on the document classification, the at least one defined external consideration, and the implemented plurality of classification protocols, wherein a signal representation presented as a numerical vector representation;
identify one or more potential section classifications for one or more of the plurality of sections based on information relating to a training set of signal representations and based on the one or more generated signal representations of each of the plurality of sections;
determine a relative accuracy of the one or more potential section classifications for one or more of the plurality of sections; and
output, based on the determined relative accuracy, one or more of the potential section classifications as one or more recommended section classifications for one or more of the plurality of sections.

10. The system as in claim 9, wherein the document classification comprises a type of legal document.

11. The system as in claim 9, wherein the code sets, when executed, cause the processor to: preliminarily define the training set of signal representations based at least in part on provided sections of text having known section classifications.

12. The system as in claim 9, wherein the code sets, when executed, cause the processor to:
assign a value for each instance in which a potential section classification is identified for a given section;
aggregate the respective values; and
identify one or more of the one or more of the one or more potential section classifications with the highest aggregated value.

13. The system as in claim 12, wherein the value includes an associated weighting based on at least one of:
a frequency of a given identified potential section classification, a historical accuracy of a given implemented classification protocol, and a probability of accuracy of a given implemented classification protocol.

14. The system as in claim 9, wherein the code sets, when executed, cause the processor to:
implement one or more overriding expert rules; and
revise the output when a recommended section classification contravenes one of the one or more overriding expert rules.

15. The system as in claim 9, wherein the code sets, when executed, cause the processor to:
compare the outputs of the first document and outputs of a plurality of previously classified documents having one or more previously classified sections; and
identify one or more differences between the outputs of the first document and outputs of one or more of the plurality of previously classified documents.

16. The system as in claim 9, wherein the code sets, when executed, cause the processor to:
generate a summary of the first document, wherein the summary comprises at least the document classification and the outputted one or more recommended section classifications;
compare the summary with one or more sample summaries having the same document classification; and
output one or more results of the comparison.

* * * * *